(12) United States Patent
Alvarez et al.

(10) Patent No.: US 7,720,588 B2
(45) Date of Patent: May 18, 2010

(54) DRIVING ASSISTANCE FUNCTION FOR A VEHICLE STATIONARY ON A SLOPE

(76) Inventors: Belen Alvarez, 2, rue de l'Appel du 18 Juin, 92800 Puteaux (FR); Xavier Marie Groult, 8 Place Clement Ader, Survilliers, 95470 (FR); Remy Delplace, 5 rue Paul Eluard, Danjoutin 90400 (FR)

( * ) Notice: Subject to any disclaimer, the term of this patent is extended or adjusted under 35 U.S.C. 154(b) by 1207 days.

(21) Appl. No.: 11/120,736

(22) Filed: May 3, 2005

(65) Prior Publication Data

US 2006/0170284 A1    Aug. 3, 2006

(30) Foreign Application Priority Data

May 3, 2004    (EP)    .................................. 04291125

(51) Int. Cl.
*G06F 19/00*    (2006.01)
(52) U.S. Cl. ............................. 701/70; 701/58; 701/65; 477/91; 477/903; 477/118; 477/107; 180/170
(58) Field of Classification Search .................... 701/70, 701/65, 58; 303/191; 188/180; 246/182; 477/40, 91, 903, 118, 107
See application file for complete search history.

(56) References Cited

U.S. PATENT DOCUMENTS

| 5,428,531 | A | * | 6/1995 | Hayafune | ..................... 701/65 |
| 5,752,211 | A | * | 5/1998 | Takasaki et al. | ................ 701/69 |
| 5,788,005 | A | * | 8/1998 | Arai | ........................ 180/65.285 |
| 5,832,400 | A | * | 11/1998 | Takahashi et al. | ............. 701/53 |
| 5,895,435 | A | * | 4/1999 | Ohta et al. | ..................... 701/59 |
| 5,916,062 | A | | 6/1999 | Siepker | |
| 5,925,087 | A | * | 7/1999 | Ohnishi et al. | ................. 701/70 |

(Continued)

FOREIGN PATENT DOCUMENTS

DE        60317277 E    * 12/2007

(Continued)

OTHER PUBLICATIONS

Boston's low floor LRV-program update [light rail vehicles]; Fraser, G.R.; Marianeschi, M.; Morse, G.T.; Railroad Conference, 1998. Proceedings of the 1998 ASME/IEEE Joint, Apr. 15-16, 1998 pp. 49-58 ; Digital Object Identifier 10.1109/RRCON.1998.668073.*

(Continued)

*Primary Examiner*—Cuong H Nguyen
(74) *Attorney, Agent, or Firm*—Dickinson Wright PLLC

(57) ABSTRACT

A process for assisting the driving of a vehicle provided with a braking system including brake calipers able to be activated as a function of a target braking force, including the steps of: determining an instantaneous state of the vehicle defined by state variables measured by sensors with which the vehicle is provided; testing a logical entry condition verified when the velocity of the vehicle is zero and when the slope is greater than a pre-defined slope; when the logical entry condition is verified, testing a logical exit condition; automatically operating the braking system to keep the vehicle static on the slope while the logical exit condition is not verified; and automatically releasing the activation of the braking system when the logical exit condition is verified.

8 Claims, 4 Drawing Sheets

U.S. PATENT DOCUMENTS

| | | | |
|---|---|---|---|
| 6,029,107 A * | 2/2000 | Sato | 701/58 |
| 6,070,118 A * | 5/2000 | Ohta et al. | 701/65 |
| 6,427,108 B1 * | 7/2002 | Kanasugi et al. | 701/51 |
| 6,575,874 B2 * | 6/2003 | Ono et al. | 477/120 |
| 6,863,047 B2 * | 3/2005 | Mijit et al. | 123/320 |
| 7,505,842 B2 * | 3/2009 | Luh | 701/55 |
| 2003/0214185 A1 | 11/2003 | Kinder et al. | |
| 2003/0227215 A1 | 12/2003 | Kinder et al. | |

FOREIGN PATENT DOCUMENTS

| | | |
|---|---|---|
| EP | 1388475 A1 * | 2/2004 |
| FR | 2838091 | 10/2003 |
| FR | 2843350 A1 * | 2/2004 |
| JP | 02060862 A * | 3/1990 |
| JP | 2000033826 A * | 2/2000 |
| JP | 2008101680 A * | 5/2008 |
| WO | WO03/098075 | * 11/2003 |

OTHER PUBLICATIONS

Research on humanization in bicycle design; Xiao Jinhua; Gao Yun; Computer-Aided Industrial Design and Conceptual Design, 2006. CAIDCD '06. 7th International Conference on; Nov. 17-19, 2006 pp. 1-5; Digital Object Identifier 10.1109/CAIDCD.2006.329393.*

Automobiltechnische Zeitschrift (Automotive Engineering Magazine), vol. 95, 1993, p. 420, "Die adaptive Getriebesteuerung fur BMW-Automobile" (Adaptvie Transmission Control for BMW Automobiles). cited by other.*

Modeling and control of a four wheel drive parallel hybrid electric vehicle; Boyali, Ali et al.;Computer Aided Control System Design, 2006 IEEE Inter. Conf. on Control Applications.*

Multiple Sliding Surface Control of Idle Engine Speed and Torque Reserve With Dead Start Assist Control; Alt, B. et al.; Industrial Electronics, IEEE Transactions on; vol. 56, Issue 9, Sep. 2009 pp. 3580-3592; Digital Object Identifier 10.1109/TIE.2009.2021593.*

Operation Pattern Recognition and Control for Hydraulic Accumulator Type Braking Energy Regeneration System of Bus; Jinyu Qu; Xiaodong Zhang; Intelligent Computation Technology and Automation, 2009. ICICTA '09. Second International Conference on; vol. 1, Oct. 10-11, 2009 pp. 439-443; Digital Object Identifier 10.1109/ICICTA.2009.113.*

Multi-domain modeling and simulation of clutch actuation system; Ming Jiang; Wei Chen; Yunqing Zhang; Liping Chen; Hongchang Zhang; Intelligent Vehicles Symposium, 2009 IEEE; Jun. 3-5, 2009 pp. 1365-1370; Digital Object Identifier 10.1109/IVS.2009.5164484.*

CAN-Based Integrated Control Strategy for the Drivetrain of Commercial Vehicles Equipped with Automated Manual; Transmission; Jingxing Tan et al.; Power Electronics and Intelligent Transportation System, 2008. PEITS '08. Workshop on Aug. 2-3, 2008 pp. 67-71; Digital Object Identifier 10.1109/PEITS.2008.20.*

Fuzzy controller design for parallel hybrid vehicle analysis using forward simulation; Naderi, P.; Mirsalim, M.; Bathaee, M.T.; Chini, R.; Vehicle Power and Propulsion Conference, 2009. VPPC '09. IEEE; Sep. 7-10, 2009 pp. 234-241 Digital Object Identifier 10.1109/VPPC.2009.5289847.*

* cited by examiner

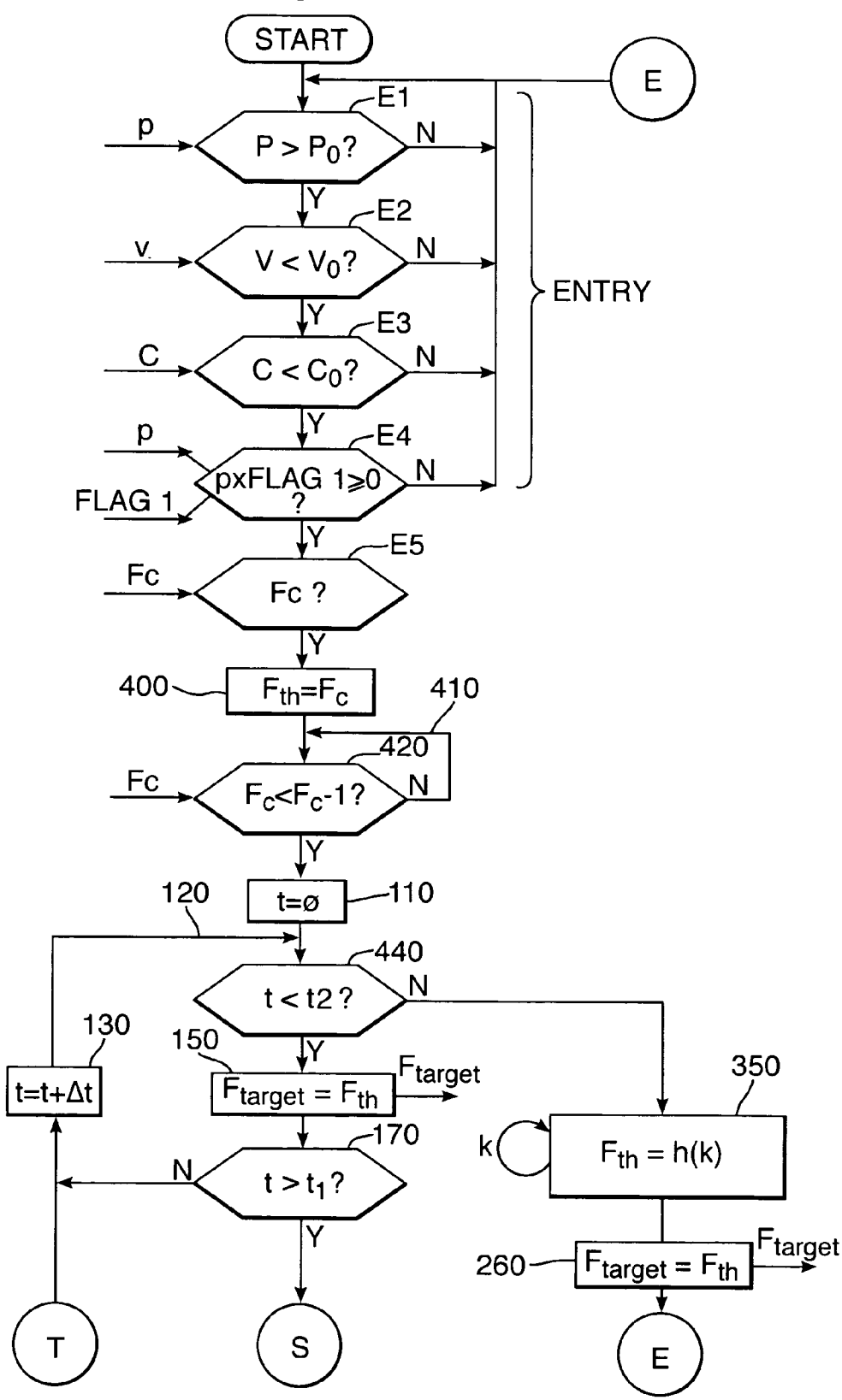

DRIVING ASSISTANCE FUNCTION FOR A VEHICLE STATIONARY ON A SLOPE

TECHNICAL FIELD

The invention relates to a process for driving assistance. More particularly, the invention relates to a process for driving assistance when the vehicle in question is on a slope.

BACKGROUND OF THE INVENTION

Driving a vehicle on a slope is a difficult operation, which in particular requires that, once the vehicle is stationary, the driver keep the brake pedal depressed. Certain operations then require release of the activation of the brake pedal. In particular, pulling away again in the vehicle to climb the slope.

This latter operation is complex, since it is necessary to pass from operation of the brake pedal to that of the accelerator pedal, while operating the clutch pedal to find the point of slip. This activation, which is stressful for the driver, often fails, leading to stalling of the engine and to displacement of the vehicle towards the bottom of the slope, which can be detrimental.

The document EP-1352798-A1 discloses a process for management of parking intended to place a vehicle in a stable stationary state without the intervention of the driver. This process is not exclusively restricted to the case of a sloping road. Generally, on the achievement of a first condition, the process consists of a first braking operation by activation of a dynamic system, and then on the achievement of a second condition, the process is continued by a second braking operation by activation of a static braking system. In a particular case, when the vehicle is stationary, an operation of measurement of the period that has elapsed since the vehicle was stopped permits starting of the first operation after a first predetermined period and starting of the second operation after a second predetermined period. By pressing on the accelerator pedal, the driver causes an operation of release of the vehicle by deactivation of the static braking system while activating the dynamic braking system, and then by progressive deactivation of the dynamic braking system. The braking forces applied by the braking systems can optionally be modulated as a function of the slope.

This document does not address the problem of stopping with the possibility of pulling away again, either up or down the slope.

SUMMARY OF THE INVENTION

The invention therefore has the aim of resolving the above-mentioned disadvantages.

The invention has as its object a process for assisting the driving of a vehicle, the vehicle being provided with a braking system including brake calipers and/or a parking brake able to be activated as a function of a target braking force, the process being characterised by the fact that it includes the steps of:

determining an instantaneous state of the vehicle defined by a plurality of state variables, the respective values of which are obtained from measurements performed by means of sensors with which the vehicle is provided;

testing a logical entry condition indicating that the instantaneous state corresponds to an entry state, by simultaneous verification of a plurality of entry conditions including at least one velocity entry condition verified when the velocity of the vehicle is greater than a threshold velocity, a slope entry condition (E1) verified when the slope is greater than a pre-defined slope and a gear lever position condition verified when the position of a gear lever indicates that the vehicle is climbing the slope; and, when the logical entry condition is verified, testing a logical exit condition indicating that the instantaneous state corresponds to an exit state, by verification of exit conditions; and, automatic activation of the braking system to keep the vehicle static on the slope, while the logical exit condition is not verified; and, automatic release of the activation of the braking system when the logical exit condition is verified.

Preferably, the plurality of entry conditions includes a torque entry condition that is verified when an engine torque is less than a threshold engine torque.

In one embodiment, the plurality of entry conditions includes an entry condition of operation of the brake pedal that is verified when a braking force required by the driver allows the vehicle to be held on the slope, the step of activation of the braking system starting only when it is detected in a detection step that the driver is releasing the brake pedal.

Preferably, when the logical entry condition is verified, the process includes a step of measurement of the instantaneous value of the slope; and, a step of calculation of a theoretical braking force able to hold the vehicle on the slope, the step of automatic activation of the braking system being performed by emitting the theoretical braking force as the target braking force.

In one embodiment, when the logical entry condition is verified, a step of acquisition of the value of the braking force required by the driver as the theoretical braking force, the step of automatic activation of the braking system being performed by emitting the value of the theoretical braking force as the target braking force.

Preferably, the process includes the steps of determining the initial instant of the start of the step of automatic activation of the brake system and of comparing, at each instant, the period that has elapsed since the initial instant with a threshold period called the reaction time.

In one embodiment, when the period is greater than the threshold period which is a first threshold period, the process includes the automatic activation of a parking brake with which the vehicle is provided.

Preferably, the logical exit condition includes a temporal exit condition which is verified when the period is greater than the threshold period which is a third threshold period, and the process is continued by the progressive release of the braking system.

Preferably, the logical exit condition includes a logical climbing exit condition indicating a wish of the driver to climb the slope, the logical climbing exit condition being defined by the verification of a plurality of climbing exit conditions including at least one gear lever position climbing exit condition that is verified when the product of the position of the gear lever measured by a gear lever position sensor and the sign of the slope is strictly positive.

Preferably, the plurality of climbing exit conditions includes an acceleration climbing exit condition that is verified when the value of the position of the accelerator pedal measured by an accelerator pedal position sensor is greater than a reference position, and an engine torque climbing exit condition that is verified when an engine torque effectively attained by the engine of the vehicle is greater than a theoretical engine torque evaluated in a step of determination of a theoretical engine torque including calculating, as a function of the slope, the theoretical engine torque able by itself to keep the vehicle static on the slope.

Preferably, the plurality of climbing exit conditions includes a clutch engagement climbing exit condition verified when the position of the clutch engagement given by a clutch engagement position sensor corresponds to a point of slip position or to a totally engaged position.

Preferably, the logical exit condition includes a descending exit condition indicating a wish of the driver to descend the slope, the descending logical exit condition being defined by verification of a plurality of descending exit conditions including at least one gear lever position descending exit condition that is verified when the product of the gear lever position measured by a gear lever position sensor and the sign of the slope is strictly negative.

Preferably, in the step of automatic release of the activation of the braking system, the braking force is progressively reduced to a zero value.

The invention also has as its object software for assisting driving containing instructions that can be read and stored on a support, the instructions being executable by a host computer, wherein the software implements a process such as those described above.

The invention also has as its object a programmable braking controller, able to implement a process such as those described above in a braking system of a vehicle, including a memory space able to store instructions of a program, a computer able to execute the instructions and an input/output interface connectable at its input to a plurality of sensors with which the vehicle is provided and at its output to at least one unit for activating a caliper of the braking system, wherein the controller is programmed to include:

a means for determination of an instantaneous state of the vehicle, which state is defined by at least one state variable obtained from measurements performed by means of the at least one sensor;

a means for testing a logical entry condition able to test whether the instantaneous state verifies a logical entry condition;

a means for testing a logical exit condition able to test whether the instantaneous state verifies a logical exit condition;

a means for generation and emission at its output of a braking force value as the target braking force; and a means for real time incrementation of a temporal variable.

The invention also has as its object a braking system intended to be fitted to a vehicle including a plurality of sensors, a braking controller and units for activation of brake calipers, wherein the braking controller is a controller as described above.

Preferably, the braking system includes at least one electromechanical brake caliper intended to be fitted to a rear wheel of the vehicle.

The invention also has as its object a vehicle including a braking system such as those described above.

BRIEF DESCRIPTION OF THE DRAWINGS

The invention will be better understood and other aims, details, characteristics and advantages of it will become more clearly apparent in the course of the following description of a particular embodiment of the invention, given solely in illustrative and non-limiting manner, with reference to the attached drawings. In these drawings.

DESCRIPTION OF THE PREFERRED EMBODIMENT

Figure 1:
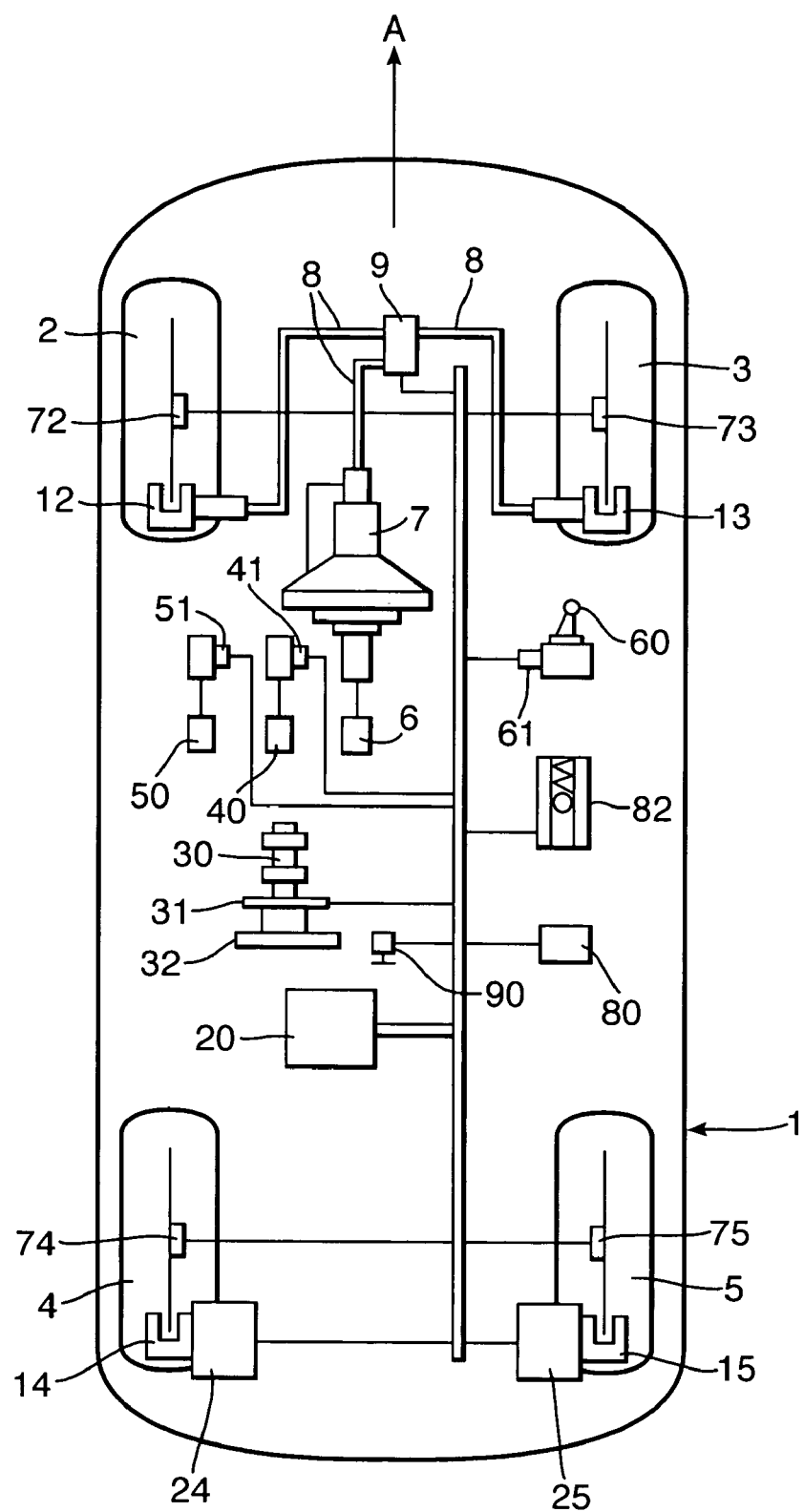
FIG. 1 shows diagrammatically a vehicle provided with a hybrid braking system.

Although the assistance process in accordance with the invention can be implemented whatever the type of braking system fitted to the vehicle, in the currently preferred embodiment the vehicle is provided with a hybrid braking system such as will now be described in detail with reference to FIG. 1.

A vehicle 1 includes two front wheels 2 and 3 and two rear wheels 4 and 5. The hybrid braking system includes a brake pedal 6 connected to a master-cylinder 7. When the brake pedal 5 is depressed, the master-cylinder 7 generates an hydraulic over-pressure which is propagated via the hydraulic unit 9 and the pipes 8 to the hydraulic brake calipers 12 and 13 with which the front wheels 2 and 3 are respectively provided.

The rear wheels 4 and 5 are respectively provided with electromechanical calipers 14 and 15. When the driver presses on the brake pedal 6, the hydraulic unit 9 also emits an electrical signal proportional to the over-pressure generated by the master-cylinder 7, indicating the braking force $F_c$ required by the driver. A braking controller 20 receives this electrical signal. The braking controller 20 includes at least a computer and a memory able, inter alia, to store programs including a series of instructions executable by the computer of the controller 20. The controller 20 includes an input/output interface permitting at the input acquisition of signals from sensors and storage of the corresponding values in memory spaces and permitting at the output the emission of output signals as a function of values read from the memory space. In response to this signal, the controller 20 calculates at each instant right and left target braking forces, which are to be respectively applied by the electromechanical calipers 14 and 15 with which the rear wheels 4 and 5 are provided. Then the controller 20 transmits control signals corresponding to the right and left target braking forces to remote computers 24 and 25, which respectively govern the activation of one electromechanical caliper. They adjust the value of the strength in amplitude and phase of the current supplied to the motor with which the electromechanical brake caliper is provided. The current strength comes from a battery and an alternator, which are not shown.

Moreover, the vehicle 1 is provided with a plurality of sensors permitting measurement of the instantaneous value of different variables, so as to define an instantaneous state of the vehicle.

The steering column 30 is, for example, provided with a sensor 31 permitting measurement of the angle of lock imparted by the driver to the steering wheel 32.

The accelerator pedal 40 includes sensor 41 permitting measurement of the degree of depression of the accelerator pedal. The sensor 41 can be a continuous sensor. The sensor 41 is preferably discreet and has for example two positions. It emits a binary signal FLAG2 taking a zero value when the driver does not press on the accelerator pedal, or at least beneath a pre-defined depression threshold value, and the value unity when the driver presses on the accelerator pedal so as to depress this beyond the threshold depression value.

The clutch pedal 50 includes a sensor 51. The sensor 51 can be a continuous sensor. Preferably, this being only to limit cost, the sensor 51 is a discreet sensor with for example three positions: a first position corresponding to the emission of a signal FLAG3 having the value unity when the driver does not press on the clutch pedal 50, the engine being connected to the wheels; a second position corresponds to emission of a signal FLAG3 of zero value when the driver presses on the clutch pedal 50 so as to be at the point of slip; lastly, the sensor 51 can be in a third position, the signal FLAG3 then taking a value of unity marked with a negative sign. This last position corresponds to the case in which the clutch pedal is depressed beyond the point of slip, the engine then being disconnected from the drive wheels.

If it includes a manual gearbox 60, the vehicle 1 can be provided with a sensor 61 giving the position of the gear lever. Advantageously, the sensor 61 is an optical discreet sensor having a plurality of positions: the first position corresponds to reverse gear, that is, to a possible displacement of the vehicle in the reverse direction of its longitudinal axis A. The value of the output signal FLAG1 is for example −1. When the gear lever is in the neutral or dead point position, the sensor 61 emits an output signal FLAG1 the value of which is 0. Lastly, when a forward gear is engaged, that is to say a possible displacement of the vehicle in the direction of its longitudinal axis A, the sensor 61 emits a signal FLAG1 of value +1.

The vehicle 1 also includes a plurality of sensors permitting determination of the kinematic state of the vehicle. Each of the wheels 2-5 is provided with a wheel velocity sensor 72-75. A wheel velocity sensor permits measurement of the instantaneous rotational velocity of the wheel to which it is fitted. This information allows the controller 20 to calculate an instantaneous velocity V of the vehicle. To measure acceleration, the vehicle 1 includes for example a lateral acceleration sensor 80 and a longitudinal acceleration sensor 82.

The braking controller can include a process for appraisal of the slope on which the vehicle is situated. An instantaneous slope p can be calculated in the following manner. Firstly, an instantaneous longitudinal velocity v of the vehicle is calculated from the rotational velocities of the wheels measured by the sensors 72 to 75. If the wheel velocity sensors are signed sensors, the velocity v is an algebraic value. The velocity v obtained is then derived with respect to time to obtain an instantaneous longitudinal acceleration value a. Secondly, a difference signal s is calculated by the difference between the calculated acceleration and the algebraic value of the longitudinal acceleration measured by the sensor 82. Lastly, the slope p is obtained by the formula $p=\tg(\arcsin(s/g))$ in which g is the acceleration of gravity. The slope p thus obtained is an algebraic magnitude: for example, if p is greater than zero, the vehicle is orientated along the slope, bonnet up; if p is less than zero, the vehicle is orientated along the slope, bonnet down.

The different sensors that have just been described are connected to the controller 20, via a network supporting for example the CAN-Bus protocol.

The vehicle 1 includes a switch 90 arranged at the driver's seat, for example on the dashboard. By pressing the switch 90, the driver starts execution of the assistance program so as to allow the assistance function proper to be active or otherwise.

Figure 2A:
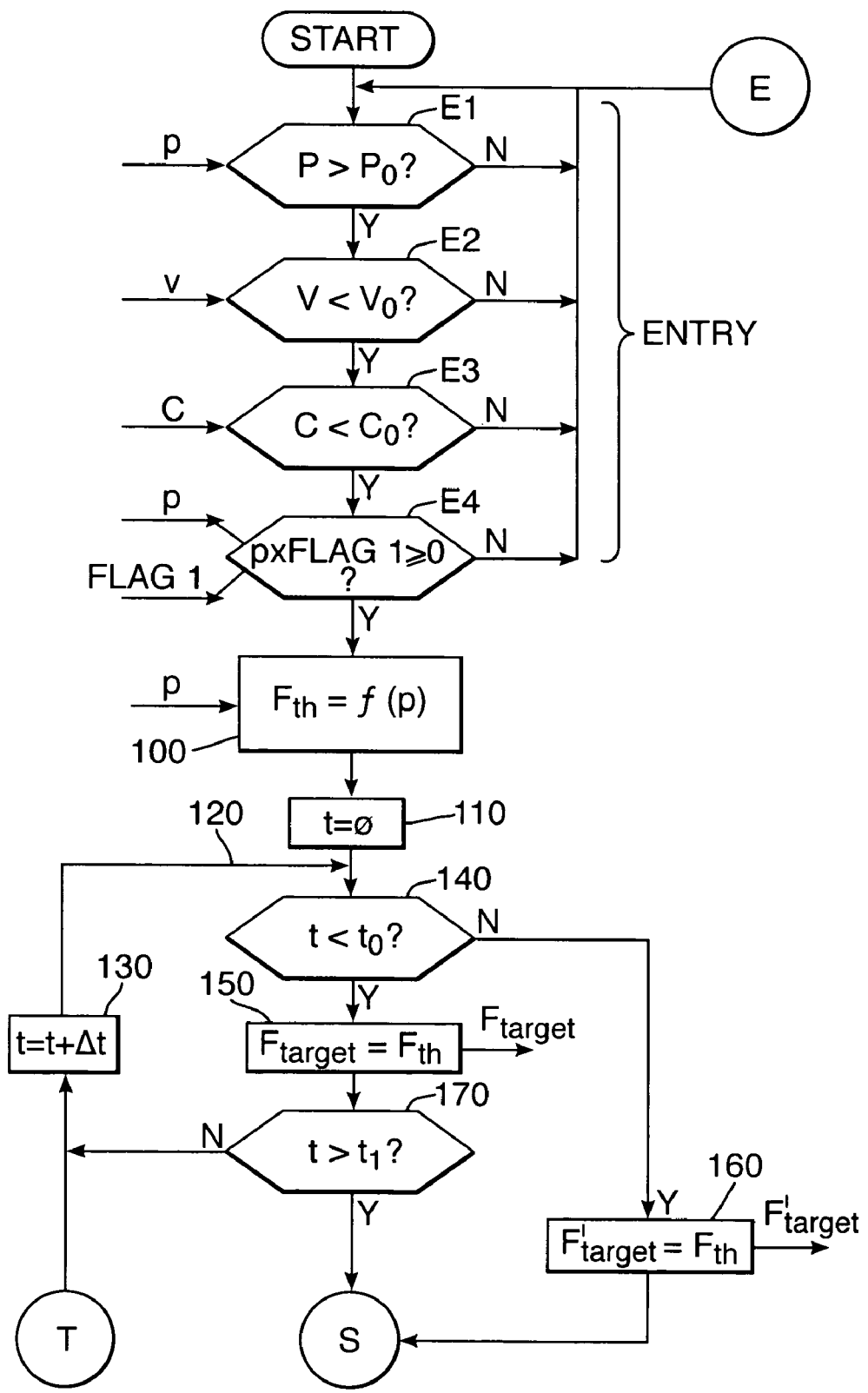
FIGS. 2a and 2b show, in the form of an algorithm, the different steps of the preferred embodiment of the process for assisting driving in accordance with the invention, implemented in the form of software in the vehicle of FIG. 1; and, FIG. 3 shows another embodiment of the assistance process in accordance with the invention.
Figure 2B:
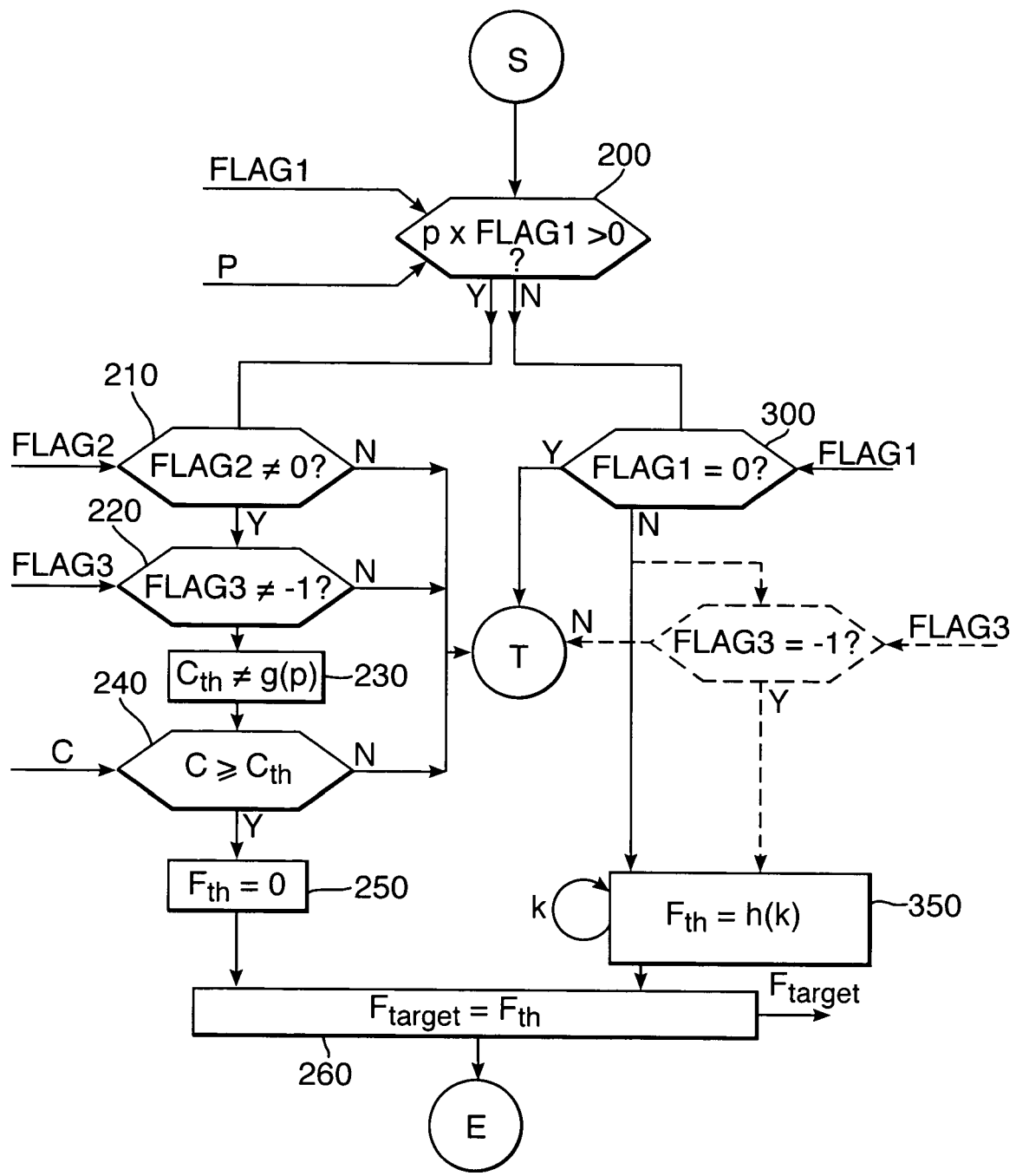

FIGS. 2a and 2b show in the form of a flow-chart the currently preferred embodiment of the process for assisting driving of a vehicle of the type described in FIG. 1.

The process in accordance with the invention is, preferably, implemented by an assistance program, the instructions of which, stored in a memory of the braking controller, are executed by the processor of the braking controller.

In FIG. 2a, execution of the assistance program starts when the driver selects the assistance function by means for example of the switch 90.

The program starts with the test of a logical entry condition. This logical condition indicates that the instantaneous state of the vehicle corresponds to a so-called entry state, in which the program takes over management of the braking system.

In the currently preferred embodiment, the logical entry condition includes simultaneous verification of the elementary entry conditions:

A slope entry condition E1 including comparing the instantaneous value of the slope measured by a slope sensor with a pre-defined slope $p_0$. The slope entry condition is verified when the slope is greater than this pre-defined slope $p_0$ indicating that the vehicle is on a slope;

a velocity entry condition E2 including comparing the instantaneous value of the velocity of the vehicle with a pre-defined threshold velocity $V_0$ the value of which is small, for example 1 km/h. The velocity entry condition is verified when the velocity v of the vehicle is less than the threshold velocity $V_0$;

a torque entry condition E3 including comparing the instantaneous value of the engine torque C, required by the driver, with a pre-defined threshold engine torque $C_0$. The torque entry condition is verified when the torque C is less than the threshold torque $C_0$; and, a gear lever condition E4 including multiplying the value of the signal FLAG1, given by the gear lever position sensor, by the slope p, or at least the sign of the slope p. The gear lever condition is verified when the result of this multiplication is greater than or equal to zero, indicating that the gear lever is in the dead point position, in a forward gear position when the slope p is positive and in a reverse gear position when the slope is negative, indicating that the vehicle is climbing the slope.

When one of these entry conditions is not verified, the program loops to the start of its execution. Conversely, when these different entry conditions are simultaneously verified, the logical entry condition is itself verified and the program takes over the braking system. When the vehicle is in the entry state, it will stop on the slope and be stationary. Therefore the braking system must be activated so as to keep the vehicle static on the slope.

In step 100, the braking controller calculates a theoretical braking force $F_{th}$ allowing the vehicle to be kept static on the slope. In order to calculate this theoretical braking force $F_{th}$, the program uses the instantaneous value of the slope determined as has been for example described above. The force $F_{th}$ is a function of the slope p. The memory of the controller 20 contains a series of calibration curves which give the recommended value of the braking force as a function of a slope value. The series of calibration curves can be indexed by parameters such as the temperature of the brakes, the updated mass of the vehicle, etc. As a function of the instantaneous value of the slope p and of the indexing parameters, the appropriate calibration curve allows a value to be read of the braking force assigned to the theoretical braking force variable $F_{th}$.

In step 110 a temporal variable t is initialised. Execution of the program then enters into a loop 120 indexed by t. At each iteration of the loop 120 the temporal variable t is incremented, in real time, by a pre-defined period Δt (step 130). The temporal variable t acts as a sort of chronometer and measures the time which has elapsed since the vehicle has been in the entry state and the program has taken over the braking system.

In step 140, the value of the variable t is compared with a first predetermined period $t_0$ corresponding to a reaction time. When t is less than this first threshold period $t_0$, the program passes to a step 150 in which the value of the theoretical braking force $F_{th}$ calculated in step 100 is assigned to the target braking force $F_{target}$ which is then transmitted to the braking system so as to operate the brake calipers in suitable manner.

When in step 140, t is not less than the first threshold period $t_0$, that is to say t is greater than or equal to $t_0$, execution of the program passes to a step 160 permitting activation of the parking brake of the braking system. The value of the theoretical braking force $F_{th}$ calculated in step 100 is then assigned to a variable $F'_{target}$ which is transmitted to the parking brake. It is to be noted that this activation of the parking brake is optional, but forms part of the preferred embodiment of the present invention.

In step 170, following the step 150 of activation of the rear brake calipers, the value of the temporal variable t, giving the period elapsed since activation of the braking system, is compared with a second threshold period $t_1$, less than $t_0$. While t is less than $t_1$, step 170 leads to step 130 of incrementation of t. Thus remaining in the loop 120, the target braking force is applied continuously, leading to holding of the vehicle on the slope at least for a duration $t_1$.

Following either activation of the calipers for $t_1$ or activation of the parking brake, the execution of the program passes, at S, to the test for a logical exit condition. When this logical exit condition is verified, the instantaneous state of the vehicle corresponds to an exit state for which the automatic activation of the braking system is no longer required, the driver wishing to pull the vehicle away again, either up the slope or down the slope. When the logical exit condition is verified, it is then necessary to automatically release activation of the braking system.

The execution of the program continues with step number 200 (FIG. 2b) which tells whether the driver requires to pull away again in the vehicle up the slope or down the slope, and this whatever the effective orientation of the vehicle on the slope. The step 200 acquires the instantaneous value of the slope p and the instantaneous value FLAG1 of the position of the gear lever 60 given by the sensor 61. In step 200, the product of the position of the gear lever FLAG1 and the slope p, or the sign of the slope p, is calculated and is compared with the value zero. When this product is greater than 0, that is to say positive, a gear lever position climbing exit condition is verified, indicating a wish to climb the slope. Conversely, when this product is negative or zero, a gear lever position descending exit condition is verified, indicating a wish to descend the slope.

When the result of step 200 indicates a wish of the driver to climb the slope, a plurality of other climbing exit conditions is verified so as to define a logical climbing exit condition. In step 210, an acceleration climbing exit condition is tested. As mentioned above, the value of the position of the accelerator pedal 40 can be a binary value given by a sensor 41 of the position of the accelerator pedal. In step 210, the program verifies whether the value of FLAG2 is different from the value zero, so as to determine whether, a gear having been selected, the driver is accelerating or otherwise.

When the accelerator climbing exit condition is verified, execution of the program passes to step 220 which includes verifying a clutch pedal position climbing exit condition, which step 220 only exists if the vehicle is provided with a manual gear-change system. For this purpose, in step 220, the value of the position of the clutch pedal given by the discreet sensor 51 is read. In step 220, the value FLAG3 must be different from the value −1 so that the clutch engagement climbing exit condition is verified, indicating connection of the engine to the drive wheels. When this logical exit condition is verified, the step 230 permits calculation of a theoretical engine torque $C_{th}$ as a function of the slope p. This theoretical engine torque $C_{th}$ is the torque allowing the vehicle to be kept static along the slope when the brakes are released. The dependence between $C_{th}$ and p can be obtained by means of the calibration curves.

The execution of the program then passes to step 240 which permits comparison of the instantaneous torque C of the engine with the theoretical torque $C_{th}$ calculated in step 230. As soon as the value of the instantaneous torque C is greater than the theoretical torque $C_{th}$, there is an automatic release of the activation of the braking system: in step 250, the theoretical braking force $F_{th}$ takes the value zero and in step 260 the theoretical braking force is assigned to the target braking force $F_{target}$ which is transmitted to the calipers or the parking brake of the braking system. At the end of step 260, the execution of the program returns, at E, to the start with evaluation of a logical entry condition. If one of the climbing exit conditions is not verified, the program returns, at T, to step 130 of incrementation of the temporal variable t and then to step 140 of comparison.

When the end of step 200 does not indicate a wish of the driver to climb the slope, the program passes to step 300 which includes verifying a second gear lever position exit condition. If, in step 300, it is detected that the gear lever is at the dead point (FLAG1=0), the program passes, at T, into the time delay loop 120, and the vehicle remains held on the slope by activation of the brakes. If, conversely, in step 300, FLAG1 is not equal to 0, then the program passes to step 350 of automatic release of the activation of the braking system. Here, the release occurs progressively so as not to surprise the driver. In step 350, the theoretical braking force $F_{th}$ is calculated as a decreasing function of the time which has elapsed since the logical descending exit condition was verified. In step 260, the theoretical braking force $F_{th}$ is assigned to the target braking force which is then transmitted to the braking system. It is to be noted that the steps 350 and 260 implicitly require a temporal loop to update the theoretical braking force $F_{th}$ as a function of a temporal variable. Moreover, a test of the value of the clamping force required by the driver $F_c$ can be provided so that if the driver requires a braking force greater than the theoretical braking force calculated in step 350, he must be able to resume control of the braking system. At E, the program returns to the start of its execution.

At the end of step 260, the program loops at E to start its execution again at the beginning.

Optionally, when in step 300 FLAG1 is not equal to 0, then the program can pass to the test of a clutch pedal position descending exit condition. If a gear is engaged, but the engine is not connected to the drive wheels, i.e. the clutch pedal is depressed, the vehicle can be driven along the slope by its own weight. Consequently, in step 310 (shown in dotted lines), the value of the signal FLAG3 emitted by the clutch pedal position sensor is compared with the value −1. If FLAG3 is different from −1, execution of the program passes to step 350. Lastly, if FLAG3 is different from −1, the program returns at T to step 130 of incrementation of the temporal variable t and then to step 140 of comparison.

FIG. 3 shows another embodiment of the process for assisting driving described in FIGS. 2a and 2b. This other embodiment proposes a first modification at the level of calculation of the theoretical braking force $F_{th}$ and a second modification at the level of departing from activation of the braking system.

When the driver wishes to be assisted, he presses on the switch 90. The program is then executed by the computer unit and starts with the steps of testing a logical entry condition which is verified by merging a plurality of entry conditions. In this modification, are again found the entry conditions E1 to E4 described above. An additional entry condition E3 relates to activation of the brake pedal: the brake pedal entry condition is verified when the driver presses on the brake pedal, that is to say when the required braking force $F_c$ is different from the value zero.

When the logical entry condition is verified, the program passes to step 400. Since in this entry state the vehicle is stationary and the driver is pressing on the brake pedal, this means that the required braking force $F_c$ is sufficient to hold the vehicle on the slope. In step 400 the value of the braking force $F_c$ required by the driver is assigned to the theoretical braking force variable $F_{th}$.

Then the execution of the program enters a loop 410 permitting detection of whether the driver is releasing the brake pedal, the required braking force $F_c$ then adopting a value less than the theoretical braking force $F_{th}$ (step 420).

As soon as the driver releases the brake pedal, the assistance program enters into automatic activation of the braking system. Step 400 allows a theoretical braking force value $F_{th}$ to be obtained at lesser cost.

Execution of the program could continue as described with reference to FIGS. 2a and 2b. In accordance with a second modification shown in FIG. 3, the program includes a comparison 440 of the value of the temporal variable t with a third pre-defined threshold period $t_2$, for example of two seconds corresponding to a reaction time. While t is less than $t_2$, the program loops on activation of the braking system. This loop, just like loop 120, can optionally include a test for the existence of a logical exit condition.

Conversely, as soon as t is greater than $t_2$, the program progressively releases the brakes by emitting a clamping force request which is a decreasing function of time (steps 350 and 260). The condition tested in step 440 therefore constitutes a temporal exit condition forming part of the logical exit conditions.

In this second embodiment, the braking system is temporarily activated so as to assist the driver, when he releases the brake pedal, for a predetermined time sufficient to allow him to pull away smoothly, no longer having to manage the brake pedal.

Thus, comparing these two described embodiments, for activation of the braking system, when the driver calls upon the assistance process when the vehicle arrives on a slope:

either the driver allows the vehicle to stop without operating the brake pedal, at least in the final phase of stopping the vehicle. In this case as soon as the velocity of the vehicle is virtually zero, the braking system is activated to keep the vehicle static on the slope;

or, the driver brakes again after stopping the vehicle and as soon as he lifts his foot the braking system is activated to keep the vehicle static on the slope.

Then, to release the braking:

either the driver indicates, within the reaction time, that he requires to pull away again, climbing or descending, and the automatic activation of the braking system allows him only to have to use the clutch pedal and the accelerator pedal, and leaves him an undefined time or a predetermined time to find the point of slip and accelerate to find the engine torque suitable to move forward;

or the driver does nothing within a pre-defined time lapse and, if the vehicle is provided with a parking brake system, this can be activated or the brakes are progressively released.

Quite obviously, for obvious safety reasons, the process in accordance with the invention is only activated if contact is made.

Although the invention has been described with reference to a particular embodiment, it is quite obvious that it is in no way limited to this and that it includes all the technical equivalents of the means described and their combinations if these enter within the scope of the invention.

The invention claimed is:

1. A braking system for applying a brake to keep a vehicle stopped on a slope and comprising;
   a brake,
   a plurality of sensors for measuring a plurality of operating conditions of the vehicle and providing measurement signals and including a slope sensor for measuring a slope angle and a velocity sensor for measuring a vehicle velocity and a gear lever sensor for measuring a gear lever position and an torque sensor for measuring an engine torque,
   a controller responsive to said measurement signals for comparing said measured slope angle to a predetermined threshold slope angle and for comparing said measured vehicle velocity to a predetermined threshold vehicle velocity and for comparing said measured gear lever position to a predetermined threshold gear lever position and for calculating a theoretical engine torque based on said measured slope angle, and
   said controller being operably connected to said brake for applying said brake in response to said slope angle being greater than said predetermined slope angle and said vehicle velocity being less than said predetermined threshold vehicle velocity and said gear lever position being the same as said predetermined threshold gear lever position and for releasing said brake in response to said measured engine torque being greater than said calculated theoretical engine torque.

2. The system as set forth in claim 1 wherein said controller is further configured to compare said measured engine torque to a predetermined threshold engine torque and for applying said brake only in response to said measured engine torque being less than said predetermined threshold engine torque.

3. The system as set forth in claim 1 further including a brake pedal sensor for measuring a brake pedal deflection.

4. The system as set forth in claim 3 wherein said controller is further configured to compare said measured brake pedal deflection to a predetermined threshold brake pedal deflection and for applying said brake only in response to said measured brake pedal deflection being less than said predetermined threshold brake pedal deflection.

5. The system as set forth in claim 1 wherein said controller is further configured to calculate a theoretical braking force based on said measured slope angle.

6. The system as set forth in claim 5 wherein said controller is further configured to apply the brake with a targeted braking force being equal to said calculated theoretical braking force.

7. The system as set forth in claim 1 further including a clutch pedal sensor for measuring a clutch pedal deflection.

8. The system as set forth in claim 7 wherein said controller is further configured to compare said measured clutch pedal deflection to a predetermined threshold clutch pedal deflection and for applying said brake only in response to said measured clutch pedal deflection being less than said predetermined clutch pedal deflection.

\* \* \* \* \*